United States Patent Office

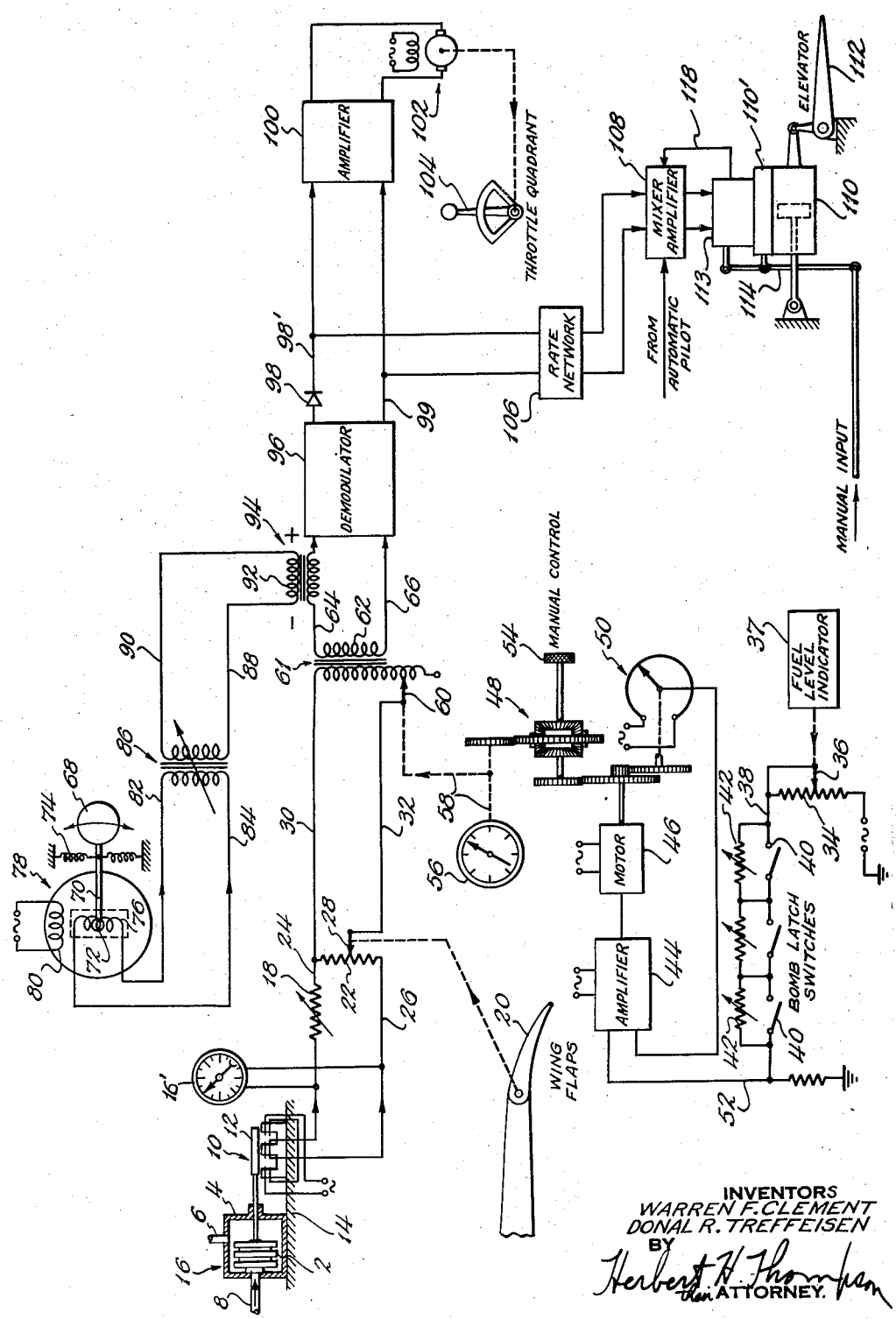

2,953,327
Patented Sept. 20, 1960

2,953,327

STALL PREVENTION SYSTEM FOR AIRCRAFT

Warren F. Clement, Plandome Manor, and Donal R. Treffeisen, Glen Cove, N.Y., assignors to Sperry Rand Corporation, a corporation of Delaware Filed Dec. 29, 1955, Ser. No. 556,163

6 Claims. (Cl. 244—77)

This invention relates to an automatic stall prevention means for aircraft. One of the most frequent causes of airplane crashes is that an airplane may enter a flight condition conducive of stall before the aviator realizes it, and once a stall is started it is very difficult to restore the proper flying conditions in time to prevent a crash, especially if near the ground. In nearly all cases a stall is preceded by an acceleration of the aircraft in its plane of symmetry normal to (a) the relative wind, (b) its velocity vector, and (c) the plane of its wings, and/or a too steep nose-up angle of attack with insufficient air speed.

According to our invention, an initial indication of approaching stall is secured by computing first the maximum permissible load factor ($n_{max}$) that may be attained without stalling. The determination of this load factor is made by measuring the dynamic air pressure, $q$, on the aircraft and combining this signal with manual and automatic variations based upon the maximum lift coefficient of the clean airplane, $C_{L\ max}$, the aircraft's wing area $S$ and the gross weight of the airplane $W$, as an inverse factor.

The manner in which this is accomplished and the equations involved are evident from the following. The normal load factor of a craft ($n$) is defined as the ratio between the total lift of the craft ($L$) and the weight of the same ($W$). In other words, this may be written as:

$$n = \frac{L}{W}$$

and the lift ($L$) of the aircraft may be expressed by the following equation:

$$L = qC_L S$$

where, as above stated, $q$ is the dynamic wind pressure,
$C_L$ is the lift coefficient,
$S$ is the wing area, and
$W$ is the gross weight.

The maximum permissible load factor for an aircraft in any flight condition is defined as $$n_{(max)} = \frac{qC_{L\ (max)}\ S}{W}$$

where $C_{L\ (max)}$ is the maximum safe lift coefficient. $C_{L\ (max)}$ also is varied in flight by the position of the wing flaps, which alters the effective wing contour so that a correction for wing flap position is also necessary in computing $n_{(max)}$. After being obtained, the maximum permissible load factor signal $n_{max}$ is subtracted, according to our invention, from a signal indicating the actual load factor $n$ (actual), modified by a desired safety margin (say, 1.1). As long as the net signal resulting from this subtraction is negative, safe flight is indicated and no signal is passed to the controls. By using a safety factor our safety controls will be brought into action as the aircraft approaches a stall condition, i.e., well before it is reached.

When the signal becomes positive, that is, when the actual load factor on the wings (as increased by said safety factor) becomes greater than the permissible load factor, a proportional corrective signal is generated and passed to one or more control elements of the craft such as the power or thrust controller for the engine and preferably also for the positional controller for the elevator. In other words, the net corrective signal is fed to a throttle servomotor to advance the throttles of the aircraft engines at a rate proportioned to the signal. This will result in an increase in air speed, hence an increase in the dynamic pressure $q$, and the system will soon recognize that a higher load factor is permissible, i.e., that the aircraft is in the safe flight region again and will cease to advance the throttles. The throttles will then remain in their advanced position in order to insure safe flight.

Throttle adjustments are quite slow in effecting changes in aircraft speed, particularly in jet aircraft, and hence a throttle control system by itself is not necessarily a complete solution. For this reason the rate of change of the aforesaid $n_{(actual)}$ minus $n_{(permissible)}$ signal is obtained and fed to the elevator control surface actuator. This has the advantage of securing a more prompt recovery from an impending stall. Also the elevator commands tend to return the aircraft to the original pitch attitude existing at the time of the correction initiation after the speed has been increased, so that there is less danger of the stall prevention system producing a nose-down attitude or descending flight after the speed correction.

The control of the throttle alone may be sufficient in the case of a slow incipient stall, that is, if the approach to a stall is gradual, and this effect is secured in our system because the elevator is moved only as the result of a significant rate of change in the aforesaid signal to the throttle control. This rate signal is either positive or negative as the aforesaid $n_{(actual)}$ minus $n_{(permissible)}$ signal increases or decreases, so that the elevator is returned to its trimmed position in the absence of changes in normal acceleration.

The single figure of the drawing illustrates schematically the structure of a preferred embodiment of the present invention.

For obtaining $n_{max}$, we have shown diagrammatically a means for continuously obtaining dynamic pressure $q$ and a means for continuously computing the existing weight $W$. The former is obtained from a Pitot tube of air speed meter or sensor 16 represented as a bellows 2 enclosed within a housing 4, the interior of which is subject to static pressure through pipe 6. The interior of the bellows is subject to the dynamic or wind pressure in the Pitot tube 8 which communicates with the interior of the bellows at its fixed end. A pick-off device 10 is connected to the movable end of the bellows. This may be in the form of an E type inductive pick-off with a movable armature 12 connected to the bellows and three wound fingers or cores mounted on a fixed or adjustable base 14. The windings on the two outer fingers are shown as oppositely excited by an alternating current supply and the secondary winding on the central finger has its output connected to a combining network which may include the air speed indicator 16'. The factor $SC_{L\ max}$ is shown as introduced into the network by variable resistor 18 which may have a fixed calibration for a given type of aircraft but since the lift coefficient of a craft varies with the position of the wing flaps, we also introduce a second variable which is varied directly by the position of the wing flaps represented at 20. For this purpose a second resistor 22 is shown as connected across the leads 24 and 26 over which a wiper 28 is moved by the movement of the flap, the operation being such that the proportion of the signal $SC_{L\ max}$ which is selected and appears across leads 30 and 32 is increased as the flaps are moved downwardly. This signal representing the product of $q$ and $SC_{L\ max}$, modified by the flap position, is then in effect divided by W, the weight of the airplane (the derivation of which being described below), to give the ratio $n_{max}$.

While the net weight of the airplane is known, the gross weight varies, of course, with the fuel load and other loads carried in the aircraft, such as its "pay" load. The factor for fuel load is shown as obtained by a resistor 34 connected to a power supply and having a variable tap 36 adjusted by a fuel load measuring device of any suitable type, or fuel flow indicator 37. As the fuel load decreases, the slider is moved downwardly, thereby short-circuiting an increasing portion of the resistor and increasing the voltage in lead 38. The "pay" load is represented as a cargo of bombs and this load variation is taken care of by providing bomb latch switches 40 which are successively closed as the bombs are dropped, thereby short-circuiting the series resistors 42 in turn. The final load signal is shown as supplied to a position follow-up servo loop comprising an amplifier 44 which actuates the servo motor 46, the output thereof driving one arm of differential 48 and feed-back signal generator or potentiometer 50. The output of potentiometer 50 is also supplied to the amplifier 44 to oppose the primary signal in lead 52 so that the shift position of motor 46 is a mechanical representation of the load carried by the aircraft. The second side of the differential 48 may be actuated from knob 54, specifically for setting up the initial gross weight of the aircraft before take-off, from which the motor driven arm of differential 48 will subtract weight as fuel is consumed and, in this example, as the bomb load is dropped thereby providing a continuous measure of the gross weight W of the aircraft. The driven side of the differential is shown connected to a gross weight meter 56 through a shaft represented by the dotted line 58. Said shaft 58 is also shown as adjusting the slider 60 on the primary winding of a variable turns ratio transformer which operates to vary the effective turns on the primary, which are excited from leads 30 and 32. As the weight decreases, the slider is moved upwardly to decrease the effective turns on the primary and thereby increase the voltage induced in the secondary winding 62, and appearing across leads 64 and 66. By this or similar means, a signal is produced proportional to the ratio $$\frac{qSC_{L\ (max)}}{W}$$

In other words, the permissible $n_{max}$.

In case this factor is exceeded by the actual load factor, a stall condition becomes imminent so we provide a means to compare this factor with the actual load factor, and the moment the latter approaches the former (by exceeding the former when boosted by a safety margin) we bring into action an automatic means for increasing the airplane speed or dynamic pressure $q$ and preferably also a means for reducing the load factor by eliminating upward acceleration and preferably introducing downward acceleration. Vertical acceleration of the aircraft is caused by a change in the vertical load on the wing which may be such as to exceed the aerodynamic lifting capability of the wing ($C_{L\ max}$) at that speed. We then say that a stall condition is being approached. It may be noted that our safety system becomes operative regardless of the actual value of $n_{(max)}$ permissible, and that it is not necessary that $n_{(actual)}$ be less than 1, since our system depends only on the expression $n_{(actual)}$ (increased by whatever safety factor is used) becoming greater than $n_{(max)}$.

To detect and measure normal acceleration, we employ some form of vertical accelerometer which is shown diagrammatically as a mass 68 on arm 70 rotatable about a shaft 72. Said mass is normally supported in neutral equilibrium by a coil spring 74 but in case of upward acceleration the mass will move downwardly in proportion to such acceleration by stretching the spring, thus rotating the rotatable winding 76 of the variable or synchro transformer 78, the fixed winding 80 of which is excited from an A.C. source. The output, therefore, across leads 82 and 84 varies as a function of vertical acceleration.

Preferably, we also introduce a factor of safety or margin selector 86 into one of the two signals ($n$ actual or $n_{max}$ permissible) which introduces a safety factor or margin to anticipate a stall condition, as explained hereinbefore. This may be accomplished by increasing the $n_{(actual)}$ signal by a small amount so that the output signal in leads 88 and 90 is greater by, say, 10% than the original signal in leads 82 and 84. This may be accomplished by making use of a margin selector in the form of a variable transformer 86 connected through leads 88 and 90 to one winding 92 of a comparison transformer 94 which subtracts $n$ actual from $n_{max}$ permissible. Accordingly, the other winding of transformer 94 is connected in series with lead 64 from the transformer 61. The two windings of transformer 94 are connected to the signals in opposed relationship so that when the signal in winding 92 is equal and opposite to that of the signal in 94, a null signal is transmitted to the demodulator 96. If, however, the signal 92 differs from that of 94, a signal is passed to the demodulator, the phase of which signal reverses according to whether $n$ actual exceeds or is less than $n$ permissible. The D.C. signals from demodulator 96 vary from plus polarity through zero to minus polarity depending upon the phase of the A.C. input thereto.

However, a stall is imminent only in case the boosted $n$ actual signal exceeds that of $n_{max}$ permissible signal.

Therefore, we block any signal that would be transmitted to the throttle in case the $n$ actual is less than $n_{max}$ permissible. For this purpose, we have shown a rectifier 98 in lead 98' connected in such a manner that it passes only a positive signal. This signal is then led through amplifier 100 to throttle servomotor 102, shown as operating the power or thrust controller shown as throttle quadrant 104 to increase the throttle when a stall condition is approached.

As stated above, we prefer also to operate the elevator at this time to hasten or increase the response of the craft to the danger signal. For this purpose, we have shown a second network connected across leads 98' and 99 in the form of a rate-taking network 106 which obtains a signal proportional only to the rate of change of the throttle signal in leads 98' and 99 and passes such rate of change signal to mixing amplifier 108.

The main actuator for the elevator 112 is represented as a moving-housing servo-boost hydraulic actuator 110 controlled from an electro-hydraulic actuator 113 which in turn is controlled from said mixing amplifier 108. If the airplane is equipped with an automatic pilot, its output may also be fed into amplifier 108, as represented by the legend on the drawing, in addition to the input from the rate network 106 in a manner similar to that shown in U.S. Patent 2,678,177. The control from the human pilot is represented as connected to the multiplying link 114 which is differentially connected both to the output of actuator 113 and to the main actuator control valve 110'. A feedback connection 118 is also shown from the actuator 113 to the mixing amplifier 108. It will be evident, therefore, that our invention may be applied to an aircraft having power means for actuating the throttle and elevator such as boosters, whether or not it is equipped with a complete automatic pilot, and that in the latter case our invention may be added as an additional control element or booster between the automatic pilot and the booster for the elevators, as well as a direct control for the throttle.

From the foregoing, it is apparent that we have provided a sure and safe means for preventing stalling of aircraft which is independent of such variable and unreliable means as wind vanes or other means for measuring angle of attack. As soon as the actual load factor for a given air speed approaches the danger point, a signal is sent to increase the air speed and at the same time a second signal responsive to the rate of change of the first signal moves the elevator to vary the load factor on the wings and stop the impending stall.

As air speed increases, $q$ increases to increase $n_{max}$ and thereby decrease the danger signal and with the aid of the proper movement of the elevators, the aircraft is rapidly removed from the danger region and the margin of safety increased. This results in a decreasing signal across leads 98' and 99, and therefore, a reversal in elevator position so that the elevator tends to return the aircraft to its original pitch attitude after the engine speed has been increased sufficiently to again maintain safe flight conditions. Our rate taking network controlling the elevator does not interfere with proper throttle control in case the approach to the stall condition is gradual. In such case, the rate of change signal is so small that the elevator is not materially affected but engine speed control alone is provided to prevent the stall.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a stall preventing means for aircraft, means for computing the load factor permissible without stalling under prevalent flying conditions including means providing a first signal proportional to air speed, means providing a second signal proportional to the maximum lift coefficient of said aircraft, means providing a third signal proportional to the instantaneous weight of the craft, means for deriving a signal in accordance with the ratio between the product of said first two signals and the third signal for producing a resultant signal representative of the permissible load factor of the aircraft, a vertical accelerometer providing a signal representative of the actual load factor as increased by vertical acceleration, and means responsive to said permissible load factor signal and said actual load factor signal for increasing aircraft air speed whenever the actual load factor signal approaches the permissible load factor signal.

2. A stall prevention means for aircraft as claimed in claim 1, further comprising means coupled with said actual load factor signal for adjusting said signal in accordance with a predetermined margin of safety whereby aircraft speed is increased as the actual load factor approaches the permissible load factor.

3. In a stall preventing means for aircraft, means for developing a first signal upon the approach of stall conditions and variable with the severity of such conditions, means controlled by said first signal for increasing the speed of the craft, means responsive to said first signal for providing a second signal which varies in accordance with the rate of change of said first signal, and means responsive to said second signal for altering the pitch attitude of the craft.

4. In a stall preventing means for aircraft having propelling means and an elevator, means for developing a first signal upon the approach of stall conditions and variable with the severity of such conditions, means controlled by said first signal for increasing the thrust of the propelling means, further means responsive to said first signal for producing a second signal variable in accordance with the rate of change of said first signal, and means responsive to said second signal for altering the elevator position of the craft.

5. A stall preventing means for aircraft as claimed in claim 1 in which the aircraft has flaps and in which a further means controlled by the position of said flaps is provided for modifying the signal proportional to said maximum lift coefficient.

6. In a stall preventing means for aircraft having thrust control means and pitch control means, means for computing the load factor permissible without stalling under prevalent flying conditions including means providing a first signal proportional to air speed, means responsive to said first signal and adapted to be adjusted in accordance with the maximum lift coefficient of said craft for modifying said first signal in accordance with such adjustment, means for providing a second signal proportional to the instantaneous weight of the craft, means responsive to said modified first signal and said second signal for obtaining a signal representative of a permissible load factor as a function of the ratio between said modified first signal and said second signal, a vertical accelerometer providing a signal representative of the actual load factor as increased by vertical acceleration, means responsive to said actual load factor signal and said permissible load factor signal for producing a control signal in accordance with the difference therebetween, means responsive to said difference signal for controlling said aircraft thrust control means in accordance therewith, means responsive to said difference signal for deriving a further signal proportional to the rate of change thereof, and means connected to receive said rate signal for controlling said aircraft pitch control means in accordance therewith.

References Cited in the file of this patent

UNITED STATES PATENTS

| | | |
|---|---|---|
| 2,487,793 | Esval et al. | Nov. 15, 1949 |
| 2,701,111 | Schuck | Feb. 1, 1955 |